(12) United States Patent
Kubler et al.

(10) Patent No.: US 11,978,065 B2
(45) Date of Patent: *May 7, 2024

(54) SYSTEMS AND METHODS TO MANAGE TRANSACTION DISPUTES USING PREDICTIONS BASED ON ANOMALOUS DATA

(71) Applicant: Fidelity Information Services, LLC, Jacksonville, FL (US)

(72) Inventors: Jeffrey Paul Kubler, Birmingham, AL (US); Shane Saunders, Milwaukee, WI (US); Joseph Fredric Sutthoff, Matthews, NC (US); Joe Leung, Sacramento, CA (US); Lauren Morrison, Jacksonville, FL (US); Matthew Petersen, Apex, NC (US); David Raynault, Winter Springs, FL (US); Philip J. Ponsaran, Fremont, CA (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,682

(22) Filed: Apr. 3, 2023

(65) Prior Publication Data

US 2023/0289824 A1    Sep. 14, 2023

Related U.S. Application Data

(63) Continuation of application No. 16/904,878, filed on Jun. 18, 2020, now Pat. No. 11,651,378.

(51) Int. Cl.
*G06Q 30/018*    (2023.01)
*G06F 9/54*    (2006.01)
(Continued)

(52) U.S. Cl.
CPC ......... *G06Q 30/0185* (2013.01); *G06F 9/547* (2013.01); *G06F 16/2365* (2019.01);
(Continued)

(58) Field of Classification Search
CPC ............. G06Q 30/0185; G06Q 20/201; G06Q 20/209; G06Q 40/02; G06Q 20/389;
(Continued)

(56) References Cited

U.S. PATENT DOCUMENTS 10,379,995 B1 *  8/2019  Walters ................ G06F 16/283
11,019,090 B1 *  5/2021  Smith ..................... G06F 21/40
(Continued)

OTHER PUBLICATIONS

R. Chejkova-Nikolov et al., "Interoperability of bank statements: A case study," 2015 38th International Convention on Information and Communication Technology, Electronics and Microelectronics (MIPRO), 2015, pp. 1505-1510, doi: 10.1109/MIPRO. 20157160510 (2015).

(Continued)

*Primary Examiner* — Michael A Keller
(74) *Attorney, Agent, or Firm* — FINNEGAN, HENDERSON, FARABOW, GARRETT & DUNNER LLP

(57) ABSTRACT

Disclosed herein are systems and methods for managing transaction disputes. Techniques include accessing a transaction pattern model associated with a user account; detecting deviation of a transaction from the transaction pattern model; transmitting, based on the detected deviation, transaction data to a user device; receiving an input at the user device in response to the transmitted data; generating, based on the received input, dispute data; storing the dispute data; monitoring data extracts associated with the user account; detecting, based on the monitoring, a data extract indicating a posted state of a transaction associated with the dispute (Continued)

data; and updating the dispute data based on the data extract indicating the posted state.

20 Claims, 14 Drawing Sheets

(51) Int. Cl.
| | |
|---|---|
| *G06F 16/23* | (2019.01) |
| *G06N 5/04* | (2023.01) |
| *G06N 20/00* | (2019.01) |
| *G06Q 20/20* | (2012.01) |
| *G06Q 40/02* | (2023.01) |
| *H04L 67/306* | (2022.01) |
| *H04L 67/50* | (2022.01) |
| *G06F 3/0483* | (2013.01) |

(52) U.S. Cl.
CPC .......... *G06F 16/2379* (2019.01); *G06N 5/04* (2013.01); *G06N 20/00* (2019.01); *G06Q 20/201* (2013.01); *G06Q 20/209* (2013.01); *G06Q 40/02* (2013.01); *H04L 67/306* (2013.01); *H04L 67/535* (2022.05); *G06F 3/0483* (2013.01)

(58) Field of Classification Search
CPC .. G06Q 20/4016; G06Q 20/407; G06Q 20/42; G06F 9/547; G06F 16/2365; G06F 16/2379; G06F 3/0483; G06F 9/541; G06N 5/04; G06N 20/00; G06N 3/0445; G06N 3/08; H04L 67/306; H04L 67/535; H04L 67/30; H04L 67/565
See application file for complete search history.

(56) References Cited

U.S. PATENT DOCUMENTS

| | | | |
|---|---|---|---|
| 2013/0339237 A1* | 12/2013 | Rich | .................. G06Q 20/4016 705/44 |
| 2016/0224958 A1* | 8/2016 | Unser | .................. G06Q 20/145 |
| 2016/0314111 A1 | 10/2016 | Fougner | |
| 2017/0142222 A1 | 5/2017 | Libow | |
| 2018/0025071 A1 | 1/2018 | Ideses | |
| 2020/0177966 A1 | 6/2020 | Kerkes | |

OTHER PUBLICATIONS

Y. Zhang et al., "The Impact of Artificial Intelligence and Blockchain on the Accounting Profession," in IEEE Access, vol. 8, pp. 110461-110477, 2020, doi: 10.1109/ACCESS.20203000505 (2020).

* cited by examiner

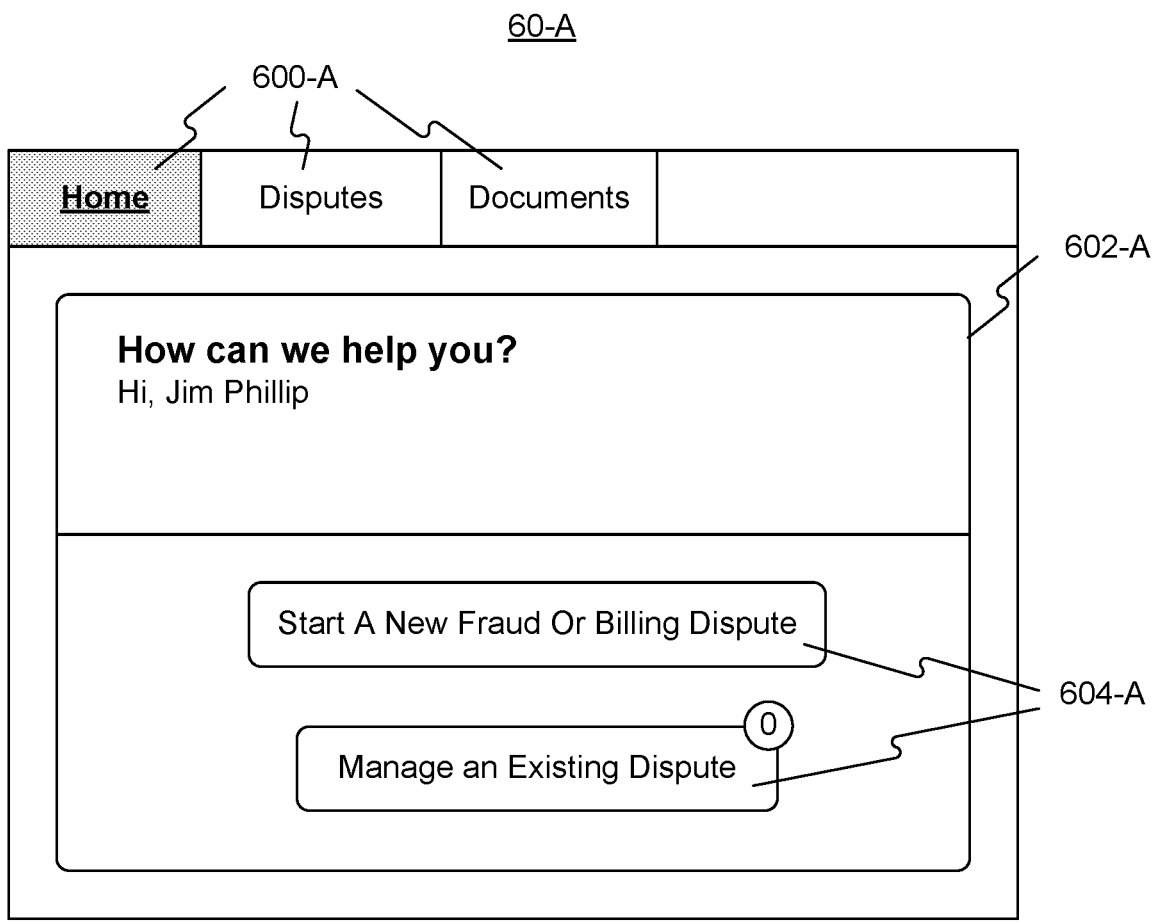
Fig. 6-A

60-B

| Home | Disputes | Documents |

New Dispute

600-B → ① Select from the available transactions.

602-B →
○ $45.51 - Publix
Feb. 24, 2020 - *Pending*

○ $300.00 – 7-Eleven
Feb. 21, 2020 - *Pending*

604-B → [ Next ]

② Please check only one statement that pertains to the dispute or fraud claim being filed.

③ Amount you should have been billed?

④ Please provide a receipt if available

⑤ What was purchased?

⑥ Please describe your attempt to resolve this dispute with the merchant in the space for additional information below.

⑦ Additional information

⑧ Done

| Home | Disputes | Documents |

600-C

New Dispute

(1) Select from the available transactions.

(2) Please check only one statement that pertains to the dispute or fraud claim being filed.

○ Unrecognized
I am not sure if I made this transaction

● Incorrect Amount
I was billed the wrong amount

○ Duplicate charge
I have been billed more than once for the same transaction ○ Paid by Other Means
I paid for this transaction via another payment method or credit card ○ Cancelled
I was charged for something I previously cancelled ○ Merchandise not as Described
The merchandise was damaged, defective, or not what I ordered.

| Back | | Next |

(3) Amount you should have been billed?

(4) Please provide a receipt if available (5) What was purchased?

(6) Please describe your attempt to resolve this dispute with the merchant in the space for additional information below.

(7) Additional information (8) Done

| Home | Disputes | Documents |

New Dispute

✏ Select from the available transactions.

✏ Please check only one statement that pertains to the dispute or fraud claim being filed.

③ Amount you should have been billed?       600-D $10.00

[Back]   602-D                                    [Next]

④ Please provide a receipt if available

⑤ What was purchased?

⑥ Please describe your attempt to resolve this dispute with the merchant in the space for additional information below.

⑦ Additional information

⑧ Done

Fig. 6-D

60-E
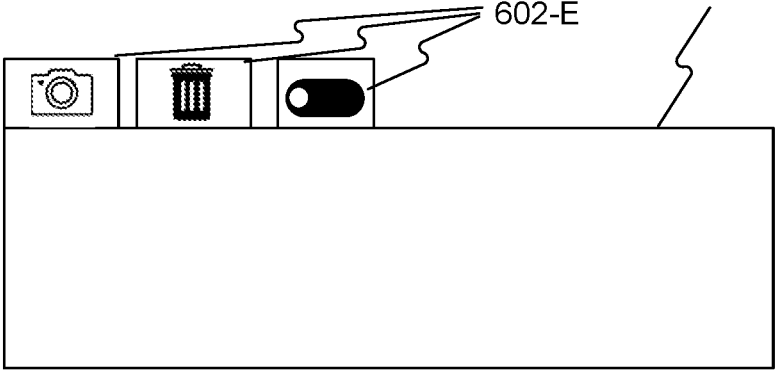
Fig. 6-E

60-F

| Home | Disputes | Documents |

New Dispute

✏ Select from the available transactions.

✏ Please check only one statement that pertains to the dispute or fraud claim being filed.

✏ Amount you should have been billed?

✏ Please provide a receipt if available

5 What was purchased?

Coffee ⟵ 600-F

[Back]  [Next]

6 Please describe your attempt to resolve this dispute with the merchant in the space for additional information below.

7 Additional information

8 Done

| Home | Disputes | Documents |

New Dispute

✏ Select from the available transactions.

✏ Please check only one statement that pertains to the dispute or fraud claim being filed.

✏ Amount you should have been billed?

✏ Please provide a receipt if available

✏ What was purchased?

6 Please describe your attempt to resolve this dispute with the merchant in the space for additional information below.

[text box] ——600-G

[Back]  [Next]

⑦ Additional information

⑧ Done

| Home | Disputes | Documents |

New Dispute

⊘ Select from the available transactions.

⊘ Please check only one statement that pertains to the dispute or fraud claim being filed.

⊘ Amount you should have been billed?

⊘ Please provide a receipt if available

⊘ What was purchased?

⊘ Please describe your attempt to resolve this dispute with the merchant in the space for additional information below.

⊘ Additional information

You are now done.

Submit Dispute

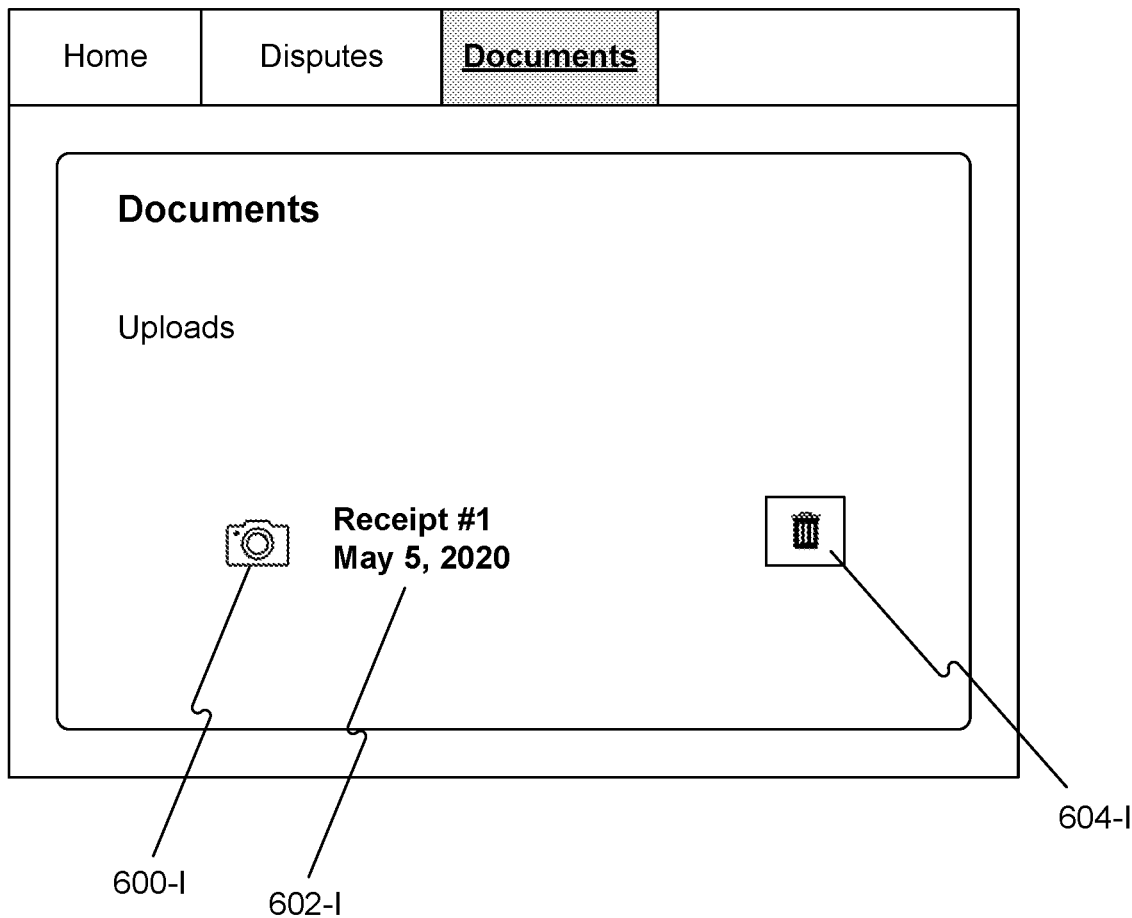
Fig. 6-I

SYSTEMS AND METHODS TO MANAGE TRANSACTION DISPUTES USING PREDICTIONS BASED ON ANOMALOUS DATA

This application is a continuation of U.S. application Ser. No. 16/904,878, filed Jun. 18, 2020, the contents of which are incorporated herein by reference.

TECHNICAL FIELD

Exemplary embodiments generally relate to systems and methods for managing dispute data between networked devices. For example, disclosed techniques may include generating and/or using models of user data to determinate whether to initiate a dispute process. Other techniques may include using automated queue release techniques to continue a dispute process between remote devices.

BACKGROUND

Conventional dispute systems typically rely on individuals to analyze data and/or identify anomalous data, such as data related to potentially unauthorized transactions made with an individual's account. Moreover, these dispute systems may not allow an individual to dispute an action until data reflects that a certain stage has been reached, such as a transaction charge posting to an individual's account. Traditional systems of gathering dispute information typically involve a call center, which an individual may call to initiate a dispute of an action. In such systems, an individual can only provide information telephonically through a call system, and an operator will only accept information after a transaction charge related to a dispute has posted. In some cases, a user may have to communicate with the call system several different times in order to manage a dispute request. Moreover, the user may have to fragment data submission, which delays dispute processing and strains system resources. Moreover, current systems obfuscate progress or details of a dispute process from the user.

In view of these deficiencies of conventional dispute systems, there is a need for improved systems and methods for managing transaction disputes. The techniques discussed below offer many technological improvements in efficiency, resource usage reduction, data anomaly prediction, and data management. For example, according to some techniques, data related to a user may be used to generate a model, such as a transaction pattern model, which may be generated using unique user account transaction data and/or implemented to identify anomalous data. Such a model may learn over time to provide identifications of anomalous data with increasing precision, such as based on new data received from a user device or a third-party device.

According to other techniques, a user device may generate dispute data prior to data reaching a particular stage, such as the generation of data indicating that a transaction has posted to a user account. This early dispute data generation may be stored in an automated queue and later automatically triggered for release when new data is detected, allowing a user to upload dispute data earlier than in traditional systems and reducing strain on call center systems, while still allowing for immediate response to a disputed transaction when remote transaction data reaches a posted status. Moreover, according to some techniques, a user device may generate dispute data including multiple types of data consolidated into a single dataset, which may be presented to a system device when remote transaction data reaches a posted status, leading to efficient use of system resources. In some cases, data may be formatted or translated when being sent from one application programming interface (API) to another, to allow for seamless connection between systems, such as a user device application using one API and a dispute resolution system using another API.

According to yet more disclosed techniques, informative visualizations may provide users with a user interface having interactive elements allowing for easier understanding of details or progress related to a dispute. In some cases, some visualizations or functionality of the user interface may not be fully available until a certain dispute stage and/or time threshold has been reached, further protecting system resources from strain caused by premature actions taken at user devices.

The disclosed system and methods address one or more of the problems set forth above and/or other problems in the prior art.

SUMMARY

Consistent with the present embodiments, an exemplary system for managing transaction disputes is disclosed. A system may include a first database storing dispute data associated with transactions, a second database storing updated dispute data associated with the transactions, a network interface, a processor; and a non-transitory computer-readable medium containing a set of instructions that, when executed by the processor, cause the processor to perform operations. Operations may include accessing a transaction pattern model associated with a user account; monitoring, at a first time, data extracts received via the network interface and associated with the user account; detecting deviation of a transaction from the transaction pattern model based on a received data extract; transmitting, via the network interface and based on the detected deviation, transaction data to a user device; receiving an input configured for a first application program interface (API) and entered at the user device in response to the transmitted data; generating, based on the received input, dispute data configured for a second API; storing the dispute data at the first database; monitoring, at a second time, data extracts received via the network interface and associated with the user account; detecting, based on the monitoring at the second time, a data extract indicating a posted state of a transaction associated with the dispute data; updating the dispute data based on the data extract indicating the posted state; and storing the updated dispute data at the second database.

In accordance with further embodiments, the operations further comprise generating the transaction pattern model based on unique transaction data of the user account.

In accordance with further embodiments, the operations further comprise updating the transaction pattern model based on the received input.

In accordance with further embodiments, the monitoring at the second time comprises monitoring for data extracts with a data profile.

In accordance with further embodiments, the data profile comprises a combination of data elements based on the dispute data.

Further disclosed embodiments include a method for managing transaction disputes. The method may comprise accessing a transaction pattern model associated with a user account; detecting deviation of a transaction from the transaction pattern model; transmitting, based on the detected deviation, transaction data to a user device; receiving an input at the user device in response to the transmitted data; generating, based on the received input, dispute data; storing the dispute data; monitoring data extracts associated with the user account; detecting, based on the monitoring, a data extract indicating a posted state of a transaction associated with the dispute data; and updating the dispute data based on the data extract indicating the posted state.

In accordance with further embodiments, the method further comprises generating the transaction pattern model based on unique transaction data of the user account.

In accordance with further embodiments, the method further comprises updating the transaction pattern model based on the received input.

In accordance with further embodiments, the user account is a first user account; and generating the transaction pattern model is further based on transaction data of a second user account.

In accordance with further embodiments, monitoring data extracts occurs during a first time period; the method comprises monitoring data extracts during a second time period; and the deviation is detected based on the monitoring during the second time period.

In accordance with further embodiments, the transmitted transaction data comprises data from two similar transactions of the user account that are determined to be similar based on both transactions having at least one of: a same transaction date, a same merchant, a same transaction payment method, or a same transaction amount.

In accordance with further embodiments, the transmitted transaction data comprises data from two similar transactions of the user account that are determined to be similar based on both transactions having at least one of: a transaction date within a threshold number of days of each other, merchants operating in the same industry, merchant names having a threshold number of characters or words in common, or a transaction amount within a threshold amount of each other.

In accordance with further embodiments, the method further comprises formatting the transaction data for display at a user interface of the user device.

In accordance with further embodiments, the input is received at the user interface and comprises at least one of: a dispute reason, a correct transaction amount, an image of a receipt, or an item identifier.

In accordance with further embodiments, storing the dispute data comprises storing the dispute data in a first database; and the method further comprises storing the updated dispute data in a second database.

In accordance with further embodiments, the method further comprises after detecting the data extract, transmitting an indication of the updated dispute data to the user device.

In accordance with further embodiments, the transaction pattern model is unique to a financial service provider associated with the user account.

In accordance with further embodiments, the monitoring comprises monitoring for data extracts with a data profile.

In accordance with further embodiments, the data profile comprises a combination of data elements based on the dispute data.

In accordance with further embodiments, the method further comprises translating the received input to an API format, wherein the dispute data is generated based on the translated input.

Consistent with other disclosed embodiments, exemplary embodiments of non-transitory computer readable storage media may store program instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 6A-6I depict exemplary user interfaces for user dispute data interaction.

DETAILED DESCRIPTION

The disclosure is generally directed to automated systems and processes for coordinating the analysis, transmission, and management of dispute data.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
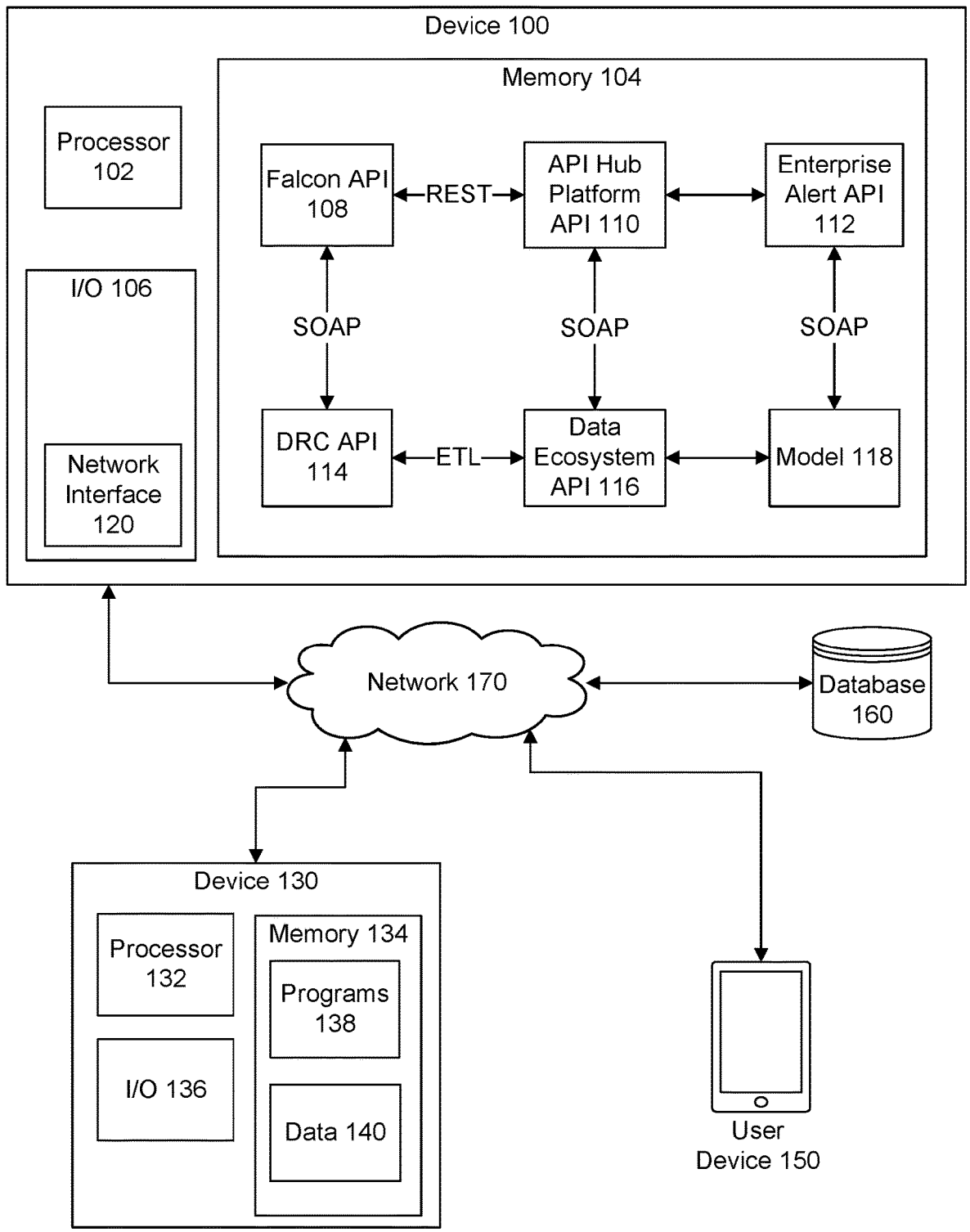
FIG. 1 illustrates an exemplary pictographic representation of a system of networked devices for managing data related to dispute requests.

FIG. 1 illustrates an exemplary pictographic representation of system 10, which may include a device 100 configured to carry out processes discussed herein. In some embodiments, device 100 may be associated with a dispute resolution manager (e.g., an entity responsible for managing financial transaction disputes). In some embodiments, system 10 may include multiple devices 100 communicably connected to each other within a local network (e.g., through network interface 120). Device 100 may include a processor 102, which may include one or more dedicated processing units, application-specific integrated circuits (ASICs), field-programmable gate arrays (FPGAs), graphical processing units, or various other types of processors or processing units coupled with memory 104. Processor 102 may constitute a single-core or multiple-core processor that executes parallel processes simultaneously. For example, processor 102 may be a single-core processor configured with virtual processing technologies. In some embodiments, processor 102 may use logical processors to simultaneously execute and control multiple processes. Processor 102 may implement virtual machine technologies, or other known technologies to provide the ability to execute, control, run, manipulate, store, etc., multiple software processes, applications, programs, etc. In another embodiment, processor 102 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 102 may execute various instructions stored in memory 104 to perform various functions of the disclosed embodiments described in greater detail below. Processor 102 may be configured to execute functions written in one or more known programming languages.

Device 100 may also include memory 104, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 104 may include any number of hard disks, random access memories (RAMs), read-only memories (ROMs), erasable programmable read-only memories (EPROMs or Flash memories), and the like. Memory 104 may include one or more storage devices configured to store instructions usable by processor 102 to perform functions related to the disclosed embodiments. Memory 104 may also include any number of programs, applications, application program interfaces (APIs), or any other data, consistent with the disclosed embodiments.

In some embodiments, memory 104 may contain a number of application program interfaces (APIs), examples of which are shown in FIG. 1. For example, Falcon API 108 may communicate with a Falcon® platform or program, which may be stored in memory 104, or remotely, such as at database 160. Falcon API 108 may receive information from a Falcon® platform or program, such as information related to a potentially fraudulent action of a user account. In some embodiments, Falcon API 108 may connect to other APIs to send and/or receive information. For example, Falcon API 108 may connect to an API Hub Platform API 110 to send or receive API information in a Representational State Transfer (REST) API format. API Hub Platform API 110 may perform REST translations between different APIs, such as between Falcon API 108 and an API on user device 150. A REST translation may involve altering (e.g., reformatting, removing portions of data to be sent, changing text according to defined associations) an API call, changing a data profile of API data, and/or otherwise configuring communications between APIs (which may be implemented at different API nodes). For example, a REST translation may involve reconfiguring data in an Extensible Markup Language (XML) format to be in a JavaScript Object Notation (JSON) format. Memory 104 may also include Enterprise Alert API 112, which may exchange data with API Hub Platform API 110 and/or model 118, among other programs, applications, data structures, etc. Enterprise Alert API 112 may be part of a program that generates, formats, and/or sends alert information to a remote device (e.g., user device 150). In some embodiments, Enterprise Alert API 112 may receive REST API data from another API (e.g., API Hub Platform API 110), and may reformat REST API data to a Simple Object Access Protocol (SOAP) format. In other embodiments, a Java application may translate API data sent between API Hub Platform API 110 and Enterprise Alert API 112 (for example, if API Hub Platform API 110 is configured to process REST API data, and Enterprise Alert API 112 is configured to process SOAP API data). While FIG. 1 notates connections between API as "REST" or "SOAP," these are merely exemplary, and data sent or received between APIs may be exchanged in accordance with any number of formats or protocols, including REST, SOAP, JSON, GraphQL, and the like.

Memory 104 may also include a model 118, which may be an artificial intelligence (AI) dispute model, consistent with disclosed embodiments. A model may be, without limitation, any one of a computer software module, an algorithm, a machine-learning model, a data model, a statistical model, a recurrent neural network (RNN) model, a long-short term memory (LSTM) model, or another neural network model, consistent with disclosed embodiments. In some embodiments, model 118 may be a model in a learning stage or may have been trained to a degree (e.g., by a developer, a machine, or a combination of both). In some embodiments, a developer may interact with model 118 to approve or disapprove of suggested changes to a model or parameters of a model (e.g., suggested by a machine). After this interaction, the model may be updated to reflect the user interactions and/or machine inputs.

Model 118 may change or generate output based on information it receives from different sources, such as Data Ecosystem API 116. Data Ecosystem API 116 may include a data aggregator, web crawler, data miner, or the like, which may receive, format, and/or send data, such as to model 118, to allow for effective configuration of and output from the model. For example, Data Ecosystem API 116 may receive periodic and/or spontaneous data (e.g., related to a particular dispute identifier, user device, transaction, etc.) from Dispute Resolution Center (DRC) API 114. DRC API 114 may include a table or other data structure that stores information related to user accounts (e.g., data of a dispute associated with a user account). In some embodiments, this data structure may be updated by an agent (e.g., an agent at a call center), a user (e.g., a user associated with a user account), or automatically by a machine. DRC API 114 may store information associated with a dispute, such as a dispute identifier, a user account identifier, a disputed amount, a transaction amount, a product identifier, a date (a transaction date, a date a transaction posted, a date a dispute was initiated, a date a dispute was closed, etc.), a timestamp, an identifier of a method of payment, an image (e.g., an image of a receipt), a signature (e.g., a vector-format signature that can be resized for different displays), an agent identifier, and/or any other data describing information related to a transaction dispute. In some embodiments, DRC API 114 may generate dispute data based on input received from a device 100 (e.g., in response to a data input received from an agent at a user interface), a user device 150, or any other device connected to system 10, consistent with disclosed embodiments.

While the described exemplary APIs are shown within memory 104, it should be noted that any of these APIs may exist within separate devices 100, devices 130, databases 160, or any other component. Implementing different APIs on different devices may reduce resource strain on a device 100 which may otherwise implement those different APIs. By way of example, model 118 may be implemented on a first device 100, API Hub Platform API 110, Enterprise Alerts API 112, and Data Ecosystem API 116 may be implemented on a second device 100, Falcon API 108 may be implemented on a device 130, and DRC API 114 may be implemented on a database 160. Other combinations are of course possible, consistent with disclosed embodiments.

Device 100 may also include input/output device (I/O) 106, which may include at least one of a display (e.g., graphical display, textual display, display 170, etc.), an LED, a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver, an input device, an output device, or other I/O device to perform methods of the disclosed embodiments. I/O 106 may include components of an interface (e.g., a user interface). I/O 106 may also include a network interface 120, which may include at least one of a wired or wireless network card/chip set.

System 10 may also include network 170, which devices (e.g., device 100 and user device 150) may use to connect to each other (e.g., to send and/or receive communications). Network 170 may be a public network or private network and may include, for example, a wired or wireless network, including, without limitation, a Local Area Network (LAN), a Wide Area Network (WAN), a Metropolitan Area Network, an IEEE 1002.11 wireless network (e.g., "Wi-Fi"), a network of networks (e.g., the Internet), a land-line telephone network, or the like. Network 170 may be connected to other networks (not depicted in FIG. 1) to connect the various system components to each other and/or to external systems or devices. In some embodiments, network 170 may be a secure network and require a password to access the network.

System 10 may include a device 130, which in some embodiments may be associated with an entity (e.g., a financial service provider) separate from a dispute resolution manager. Device 130 may include a processor 132, which may include any or all of the aspects of processor 102, consistent with disclosed embodiments. Device 130 may include memory 134, which may include any or all of the aspects of memory 104, consistent with disclosed embodiments. Memory 134 may store programs 138, which may include one or more programs (e.g., APIs, processes, modules, code, scripts, or functions) used to perform methods consistent with disclosed embodiments. Programs 138 may be written in one or more programming or scripting languages. Memory 134 may also maintain data 140, which may include data associated with a user account, financial transaction, particular device, model, communication, or any other data linked to a dispute. Device 130 may also include input/output devices (I/O) 136, which may include at least one of the devices discussed above with respect to I/O 106.

Figure 2:
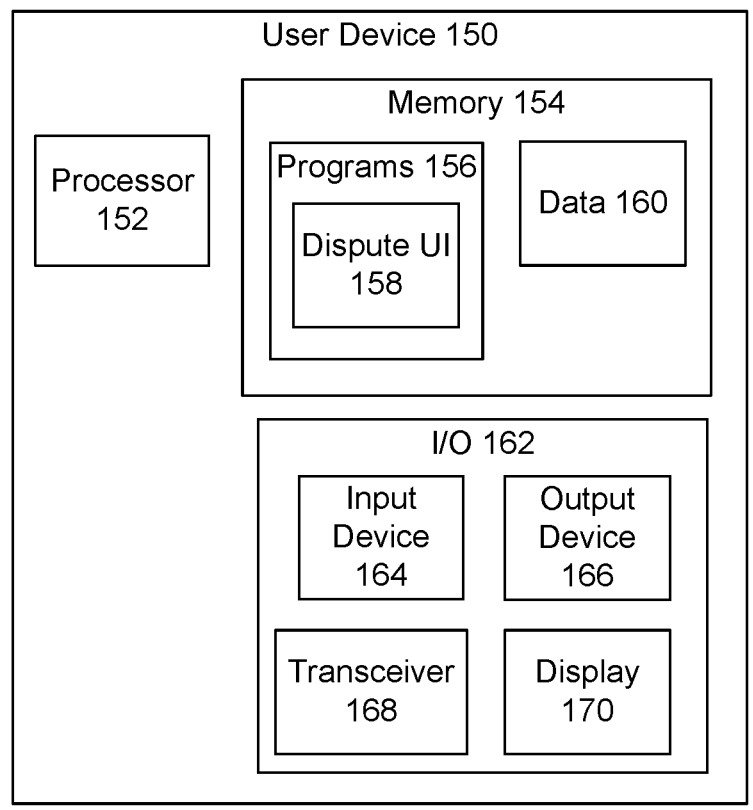
FIG. 2 illustrates an exemplary pictographic representation of a user device for dispute data interaction.

System 10 may also include a user device 150, discussed further with respect to FIG. 2. In some embodiments, system 10 may include one or more databases 160 configured to store data for use by system 10, consistent with disclosed embodiments. In some embodiments, database 160 may be configured to store datasets and/or one or more dataset indexes, consistent with disclosed embodiments. Database 160 may include a cloud-based database (e.g., Amazon Relational Database Service (RDS)) or an on-premises database. Database 160 may include datasets, model data (e.g., model parameters, training criteria, performance metrics, etc.), and/or other data, consistent with disclosed embodiments. Database 160 may include data received from one or more components of system 10 and/or computing components outside system 10 (e.g., via network 170).

FIG. 2 illustrates an exemplary pictographic representation of user device 150, which may carry out processes discussed herein. User device 150 may include a processor 152, which may include any or all of the aspects of processor 102, consistent with disclosed embodiments. User device 150 may also include memory 154, which may include any or all of the aspects of memory 104, and which may store instructions usable by processor 152 to perform functions related to the disclosed embodiments. For example, memory 154 may store programs 156, which may have any or all of the aspects of programs 138, consistent with disclosed embodiments. To further this example, programs 156 may include a dispute user interface (UI) 158, which may display interactive graphical user interfaces to a user, for example, at display 170. In some embodiments, dispute UI 158 may send and receive data to and from APIs, for example API Hub Platform API 110 or Enterprise Alert API 112. Memory 154 may also include data 160, which may include user account data, dispute data, transaction data, data input by a user at user device 150, or any other data for use in the processes described herein. In some embodiments, data 160 may include data tracked at user device 150 (e.g., by a program 156). For example, a program 156 may track actions taken at user device 150 (a mouse click, button press, touchscreen interaction, transaction initiated, purchase made, webpage viewed, a download, etc.). By way of further example, a program 156 may track (e.g., using a browser extension, cookie, or the like) a user action taken in an Internet browser to purchase a product, and may store data containing details of the transaction (e.g., a product identifier, transaction amount, merchant identifier, transaction date, etc.) in data 160. In some embodiments, tracked action data may be later linked to corresponding data from a third-party device (e.g., a device associated with a financial service provider), sent to a model 118 to update the model, sent to model 118 to trigger the model to prompt Enterprise Alert API 112 to issue an alert, and/or manipulated in any way to carry out the processes described herein.

User device 150 may also include input/output devices (I/O) 162, which may include an input device 164, which may include at least one of a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, or the like. As will be appreciated by one of skill in the art, input device 164 may be any device capable of receiving inputs, including user inputs, to perform or assist in performing methods consistent with disclosed embodiments.

I/O 162 may also include an output device 166, which may include any device configured to provide user feedback, such as a visual display, a speaker, a haptic feedback device, or the like.

I/O 162 may include a transceiver 168, which may be configured to connect with at least one of any type of data network. For example, transceiver 168 may be at least one of a Wi-Fi transceiver, a LiFi transceiver, Near Field Communication (NFC) transceiver, a radio transceiver, an ultra-high frequency (UHF) transceiver, a Bluetooth transceiver, an infrared transceiver, or other wireless transceiver.

I/O 162 may include a display 170, which may display data or other information associated with the processes described herein. For example, display 170 may include a liquid crystal display (LCD), in-plane switching liquid crystal display (IPS-LCD), light-emitting diode (LED) display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 170 may display graphical interfaces, interactable graphical elements, animations, dynamic graphical elements, and any other visual element.

Figure 3:
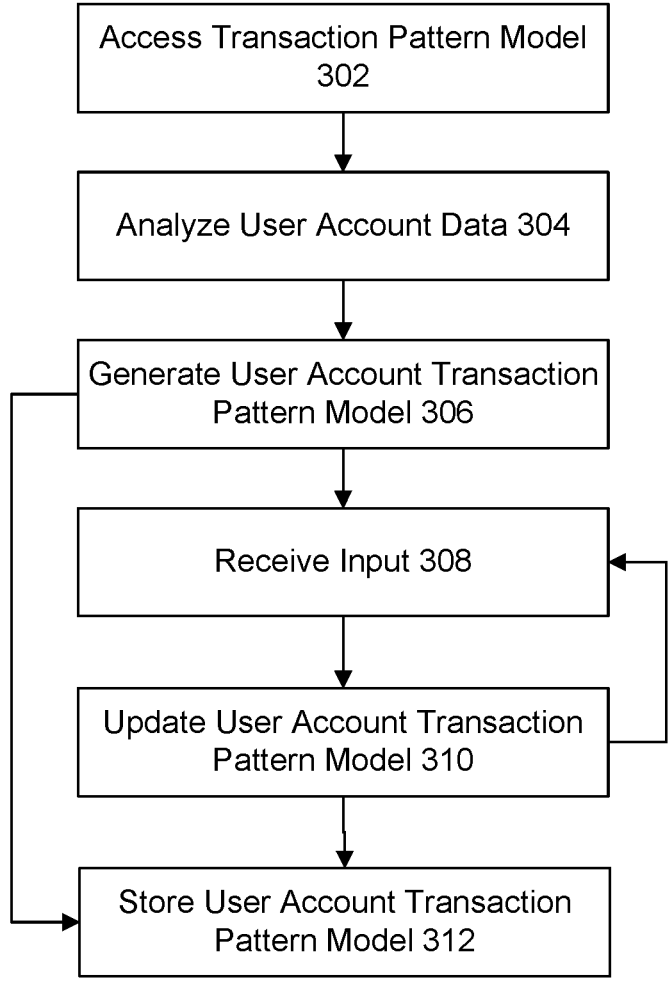
FIG. 3 depicts a flowchart of an exemplary process for generating a user account transaction pattern model.

FIG. 3 depicts a flowchart of an exemplary process 300 for generating a user account transaction pattern model. In accordance with above embodiments, process 300 may be implemented in system 10 depicted in FIG. 1, or any type of data-exchange network environment. For example, process 300 may be performed by a processor (e.g., processor 102) and/or other components of device 100, device 130, or user device 150, database 160, or by any other computing device, combination of computing devices, or system(s). All or portions of process 300 may be carried out using an API or multiple APIs, such as those discussed above, which may be implemented on the same device or separate devices.

At step 302, process 300 may access a transaction pattern model (e.g., a model 118). Accessing a transaction pattern model may include retrieving it from a local or remote storage component, examining a parameter of a transaction pattern model, and/or generating a transaction pattern model. In some embodiments, a transaction pattern model may be based on data from a single user account (i.e., a first user account). In other embodiments, a transaction pattern model may be based on data from multiple user accounts and/or multiple user devices. For example, a transaction pattern model may be based on transaction data from first user account and a second user account. In some embodiments, a transaction pattern model may be unique to a financial service provider associated with a user account, such that multiple transaction pattern models may be stored and/or updated separately from each other, while still being associated with a single user account. In some embodiments, data from multiple user accounts may be aggregated and used to train (either supervised or unsupervised) a model, which may involve apply a dataset to the model, adjusting a parameter, analyzing a result, and adjusting the model again based on the analysis.

At step 304, process 300 may analyze user account data, which may comprise data generated in response to a transaction made using a user account and/or a user device 150 (e.g., a transaction date, a merchant identifier, a transaction payment method, a transaction amount, a transaction location, a user location, a product identifier, a product category, a merchant industry, a device identifier, a username, an account number, etc.).

At step 306, process 300 may generate a user account transaction pattern model. In some embodiments, this model may represent patterns associated with a user account. For example, generating the transaction pattern model may be based on unique transaction data of the user account, which may include unique combinations of transaction data, which may include transaction amounts, transaction payees, transaction frequencies, transaction locations, transaction purchase data, and the like.

At step 308, process 300 may receive an input, which may include a data input received in response to an input at a device. For example, a user device 150 may initiate a transaction, which may result in the generation of transaction data, which may be sent to a device implementing process 300 and received as an input.

At step 310, process 300 may update a user account transaction pattern model. For example, process 300 may update a transaction model (e.g., a transaction pattern model associated with a user account) based on the input received at step 308 (e.g., an input associated with the user account). In some embodiments, process 300 may perform steps 308 and/or 310 iteratively before proceeding to step 312. For example, after receiving an input and updating a user account transaction model, process 300 may prompt a device for additional input. By way of example, a device implementing process 300 may prompt a user device 150 or a device 130 (e.g., a financial service provider device) for additional input associated with a user account not already received (e.g., an input of a transaction amount may have been received from a device 130, but process 300 may prompt a user device 150 to release an input of product identifier, which in some cases a device 130 may be unaware of). Steps 308 and 310, along with any other step associated with process 300, may be performed according to machine-learning model.

At step 312, process 300 may store a user account transaction pattern model. In some embodiments, the model stored may be the model generated at step 306 and/or the model updated at step 310. Storing a user account transaction pattern model may include sending it to a device separate from a device implementing process 300. Storing a user account transaction pattern model may comprise storing it in memory 104, memory 134, database 160, or any other storage medium.

Figure 4:
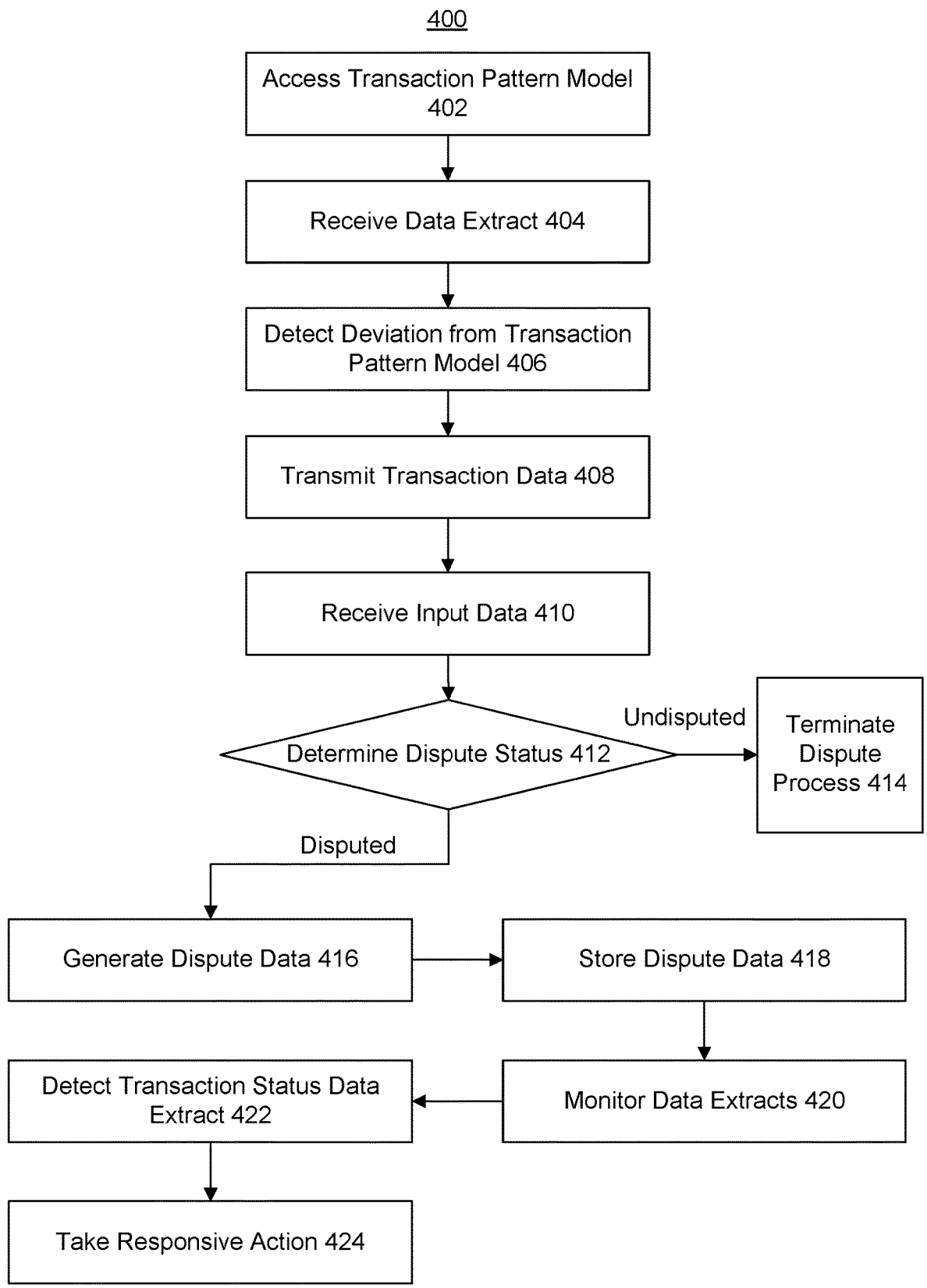
FIG. 4 depicts a flowchart of an exemplary process for implementing responsive actions using a transaction pattern model.

FIG. 4 depicts a flowchart of an exemplary process for implementing responsive actions using a transaction pattern model. In accordance with above embodiments, process 400 may be implemented in system 10 depicted in FIG. 1, or any type of data-exchange network environment. For example, process 400 may be performed by a processor (e.g., processor 102) and/or other components of device 100, device 130, or user device 150, database 160, or by any computing device, combination of computing devices, or system. All or portions of process 400 may be carried out using an API or multiple APIs, such as those discussed above, which may be implemented on the same device or separate devices.

At step 402, process 400 may access a transaction pattern model, which may be associated with a user account. In some embodiments, this model may represent patterns associated with a user account. For example, generating the transaction pattern model may be based on unique transaction data of the user account, which may include unique combinations of transaction data, which may include transaction amounts, transaction payees, transaction frequencies, transaction locations, transaction purchase data, and the like.

At step 404, process 400 may receive a data extract. In some embodiments, process 400 may receive a data extract as a result of monitoring (e.g., at a first time, during a first time period) data extracts, which may be associated with a user account and may be received by a device implementing process 400 via a network interface.

At step 406, process 400 may detect a deviation from a transaction pattern model, which may be a user account transaction pattern model (e.g., unique to a particular user). For example, process 400 may detect a deviation of a transaction from a transaction pattern model (e.g., the transaction pattern model accessed at step 402) based on a received data extract (e.g., the data extract received at step 404). A deviation may occur when a data element or combination of data elements of transaction data deviate from at least one parameter of a transaction pattern model. For example, a threshold of one of the following, or a composite threshold of multiple of the following, may be violated (which may be unique to a user account, as dictated by a model): a transaction date range, a merchant identifier within a predetermined list, a transaction payment method (e.g., within a predetermined list), a transaction amount range, a transaction location area, a user location area, a product identifier (e.g., within a predetermined list), a product category (e.g., within a predetermined list), a merchant industry (e.g., within a predetermined list), a device identifier (e.g., within a predetermined list), a username (e.g., an authorized user identifier), an account number, etc.

In some embodiments, a deviation may also be detected when two or more transactions (both of which may be associated with a user account) have a threshold degree of similarity to each other. For example, two transactions may be determined to be similar based on both transactions having at least one of: a same transaction date, a same merchant, a same transaction payment method, or a same transaction amount. In some embodiments, two transactions may be determined to be similar based on both transactions having at least one of: a transaction date within a threshold number of days of each other, merchants operating in the same industry, merchant names having a threshold number of characters or words in common, a transaction amount within a threshold amount of each other, etc. Detecting such deviations, consistent with disclosed embodiments, may allow for identification of and response to potentially erroneous duplicate transactions.

Process 400 may generate deviation data, which may describe any aspect of a detected deviation (e.g., a degree of deviation with respect to a threshold, which may be a threshold of a model). For example, deviation data may include a transaction status indicator, which may identify a transaction as anomalous, unauthorized, or erroneous, and may include a likelihood of accuracy of the identification, which may be based on a degree of deviation.

At step 408, process 400 may transmit transaction data. Transaction data may include a transaction date, a merchant identifier, a transaction payment method, a transaction amount, a transaction location, a user location, a product identifier, a product category, a merchant industry, a device identifier, a username, an account number, etc. In some embodiments, transaction data may be transmitted over a network interface to a user device (e.g., user device 150), and may be based on the detected deviation. In some embodiments, transaction data may include deviation data (e.g., data related to similar transactions, such as discussed with respect to step 406).

At step 410, process 400 may receive input data, which may include a transaction status indicator, which may indicate that a user identifies a transaction as anomalous, unauthorized, or erroneous. In other embodiments, a transaction status indicator may indicate that a user identifies a transaction as not anomalous, not unauthorized, or not erroneous. Input data may also include a reason for a user transaction identification or other input related to a transaction (a transaction date, a product purchases, etc.). In some embodiments, input data have been input at one device (e.g., user device 150) and sent to another device (e.g., device 100). In some embodiments, the input data may be configured for a first application program interface (API) and/or may have been entered at the user device in response to the transmitted data. For example, input data may be received from a user device 150 in response to information related to a potentially anomalous transaction, which may have been displayed at the user device. In some embodiments, the input data may be configured in a first API format, such REST or SOAP, and process 400 may translate input data to a second API format.

At step 412, process 400 may determine a dispute status. In some embodiments, a dispute status may be one of several dispute statuses, such as disputed, undisputed, incomplete, or unknown. In some embodiments, a dispute status may comprise a likelihood of the accuracy of a transaction status identification (e.g., 80% likelihood that a transaction is correctly identified as erroneous), which may be based on transaction data, account data, input data (which may have been translated to a particular API format), and/or deviation data. For example, if deviation data indicates that a deviation from a model is small and input data includes a small amount of data (e.g., only an indicator that a transaction is disputed), the dispute status may indicate that the transaction is disputed, but may also indicate that the likelihood of transaction as being accurately identified as unauthorized is small. In some embodiments, a likelihood of accuracy of a transaction status identification may be correlated with a user history. For example, if a user has submitted a threshold number of incorrect disputes (e.g., disputes misidentifying a transaction), a likelihood of accuracy of a transaction identified as unauthorized may be decreased.

In some embodiments, determining a dispute status may be based on a combination of transaction data, account data, input data, and/or deviation data. For example, in some embodiments, a dispute status may be determined solely based on input data (e.g., an indicator that a user identifies a transaction as anomalous, unauthorized, or erroneous). Additionally or alternatively, in other embodiments, a dispute status may be determined based on deviation data (e.g., degree of deviation exceeding a threshold) and input data. For example, if a degree of deviation exceeds a threshold and input data includes a threshold level of data elements (e.g., an account number confirmation, a transaction date confirmation, etc.), a dispute status may be determined to be disputed. In some embodiments, if input data does not include a threshold level of data elements or accuracy, a dispute status may be determined to be invalid, unknown, or incomplete.

At step 414, process 400 may terminate a dispute process. For example, if process 400 determines that a dispute status is undisputed (e.g., based on input data), it may terminate a dispute process. In some embodiments, terminating a dispute process may include transmitting a notification to a user device indicating the termination. In some embodiments, a record of the termination may be generated and/or stored (e.g., at database 160).

At step 416, process 400 may generate dispute data, which may be based on received input and/or may be configured for an API (which may be a second API with respect to a first API for which data was configured at another step in process 400). Dispute data may include any combination of transaction data, account data, input data, and/or deviation data. In some embodiments, dispute data may include an identifier of a device and/or agent responsible for processing a dispute in the future.

At step 418, process 400 may store the dispute data in a database (e.g., database 160). In some embodiments, dispute data may be stored with a trigger, which may be configured to prompt a device and/or user to re-evaluate the dispute data at a set point in the future, further ensuring that data does not become stale and unnecessarily strain data storage resources.

At step 420, process 400 may monitor data extracts (e.g., at a second time, such as with respect to monitoring for a data extract received at step 404). In some embodiments, process 400 may receive a data extract via a network interface. A data extract may be associated with a user account (e.g., may include an account number of a user account). In some embodiments, monitoring data extracts may include monitoring for data extracts with a particular data profile, which may include a combination of data elements, which may be based on dispute data. For example, process 400 may monitor data extracts for those with a data profile matching a threshold number and/or types of data elements, which may include a dispute identifier, a user account identifier, a disputed amount, a transaction amount, a product identifier, a date (a transaction date, a date a transaction posted, a date a dispute was initiated, a date a dispute was closed, etc.), a timestamp, an identifier of a method of payment, an image (e.g., an image of a receipt), a signature (e.g., a vector-format signature that can be resized for different displays), an agent identifier, and/or any other data describing information related to a transaction dispute. As a non-limiting further example, a threshold may be reached when an extract has a data profile that includes a predetermined combination of a particular dispute identifier and a particular user account identifier. Of course, many other combinations of data elements of a data profile may be achieved, consistent with the disclosed embodiments.

At step 422, process 400 may detect a transaction status data extract. For example, process 400 may detect a data extract indicating a posted state of a transaction, which may be associated with particular dispute data. In some embodiments, a data extract may indicate that an inquiry has been sent to a device associated with a user or a merchant. Data extracts may be detected based on monitoring (e.g., monitoring performed at step 420).

At step 424, process 400 may take a responsive action, which may be based on a data extract. A responsive action may include generating, modifying, deleting, storing, and/or transmitting dispute data. For example, a responsive action may include updating dispute data based on a data extract indicating the posted state, such as by adding an indicator of the posted state to the dispute data. Such updates may occur in response to detecting a data extract indicating a posted state of a transaction. In some embodiments, such as after detecting a data extract, process 400 may transmit an indication of an updated dispute status to a device (e.g., user device 150). In some embodiments, a responsive action may also include storing updated dispute data at a database, which may be linked to an API, such as DRC API 114.

Figure 5:
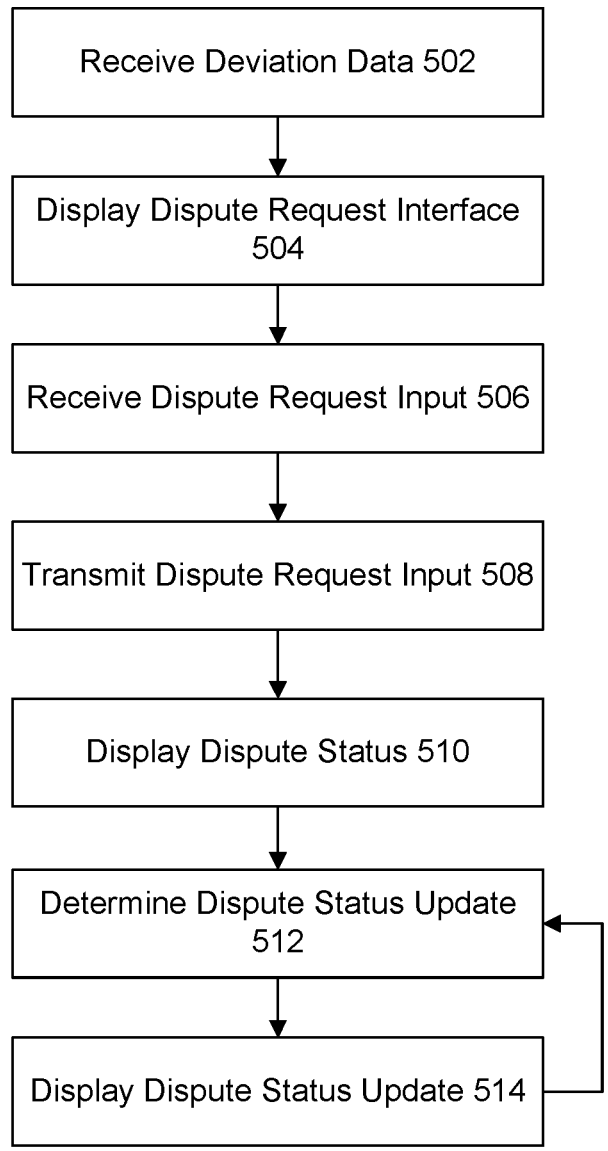
FIG. 5 depicts a flowchart of an exemplary process for generating dispute request data.

FIG. 5 depicts a flowchart of an exemplary process 500 for generating dispute request data. In accordance with above embodiments, process 500 may be implemented on user device 150 depicted in FIG. 1. For example, process 500 may be performed by a processor (e.g., processor 152) and/or other components of user device 150, device 100, device 130, database 160, or by any computing device, combination of computing devices, or system. Process 500 may implement steps or aspects of process 400, consistent with disclosed embodiments. All or portions of process 500 may be carried out using an API or multiple APIs, such as those discussed above, which may be implemented on the same device or separate devices. In some embodiments, all or portions of process 500 may be carried out using an application on a user device 150, which may have been downloaded from a remote source (e.g., a device 100).

At step 502, process 500 may detect a deviation. A deviation may be detected at a user device 150, a device 100, or any other computing device. Detecting a deviation may include steps described with respect to process 400. In response to detecting a deviation, an action may be taken, such as displaying a dispute request interface, discussed below.

At step 504, process 500 may display a dispute request interface, which may be displayed at a user device 150. In some embodiments, data associated with the dispute request interface and/or the dispute request interface itself, may be sent from a device 100 to a user device 150 (e.g., for display at user device 150). In some embodiments, the dispute request interface may include transaction data, account data, input data, and/or deviation data. For example, the dispute request interface may include transaction data of a transaction in response to which a deviation (e.g., from a transaction pattern model) was detected. In some instances, process 500 may format transaction data, or any other data, for display at an interface (e.g., a user interface of user device 150). Formatting may occur at a device 100 and/or a user device 150. In some embodiments, a dispute request interface may include input areas where a user may input information. For example, a dispute request interface may include input areas for information related to a transaction and/or dispute, such as a dispute reason, a transaction amount (e.g., a correct transaction amount, an expected transaction amount, an actual transaction amount, etc.), an image (e.g., of a receipt, an order summary, an order confirmation, or any other information related to a transaction), an item identifier (e.g., a UPC code, an EAN code, a QR code, a Code 39 code, or any other identifier that uniquely identifies a product), and/or an audio recording. In some embodiments, a dispute request interface may include interactive elements with which a user may interact to input information, such as a text field, a button, a slide bar (e.g., to input an amount of a transaction), a drop-down menu (e.g., to input a dispute reason), a graph, a timeline, or any other interactive element to facilitate the input of information. In some embodiments, interaction with an interactive element may activate a sensor of a device (e.g., a camera of user device 150 may be activated, such as to enable the device to capture an image of a receipt).

At step 506, process 500 may receive dispute request input. As discussed above, dispute request input may include information related to a transaction and/or dispute, such as a dispute reason, a transaction amount (e.g., a correct transaction amount, an expected transaction amount, an actual transaction amount, etc.), an image (e.g., of a receipt, an order summary, an order confirmation, or any other information related to a transaction), an item identifier (e.g., a UPC code, an EAN code, a QR code, a Code 39 code, or any other identifier that uniquely identifies a product), and/or an audio recording. In some embodiments, dispute request input may include an indicator that a user confirms information related to a transaction and/or dispute is accurate (e.g., that a date and amount of a transaction are accurate). In some embodiments, dispute request input may be received at a user device 150.

At step 508, process 500 may transmit dispute request input (e.g., input received at step 506). In some embodiments, dispute request input may be transmitted from a user device 150 to a device 100, and may be routed through network 170. In some embodiments, a user interface may be sent by a device 100 to user device 150 in response to device 100 receiving and/or analyzing a transmitted dispute request input (e.g., to prompt the user device 150 for additional information to complete the transaction request). In some embodiments, process 500 may not proceed with transmitting dispute request input unless at least one threshold criterion is met. As one non-limiting example, process 500 may not transmit dispute request information unless the dispute request input includes a dispute reason. Other criteria and combinations of criterions are possible, consistent with the disclosed embodiments.

At step 510, process 500 may display a dispute status (e.g., at display 170). In some embodiments, a dispute status may be determined at a device 100 and transmitted to a user device 150. For example, a dispute status of "submitted," "reviewing dispute," "pending," "processed," "waiting for transaction posting," or "awaiting customer response," may be displayed. In some embodiments, a progress bar, timeline, graph, or other visual indicator showing progress of a dispute may be displayed.

At step 512, process 500 may determine a dispute status update. In some embodiments, a device 100 and/or device 130 may determine a dispute status update. In some embodiments, process 500 may determine a dispute status update by parsing a communication received from a device (e.g., device 100). Such a communication may contain updated dispute data, updated transaction data, or any other data indicating a new status of a dispute. For example, in response to detecting a transaction status data extract (e.g., according to step 422), a device 100 may transmit the data extract and/or related information (e.g., updated dispute data) to a user device 150. In some embodiments, process 500 may proceed to step 512 after step 514.

In some embodiments, a device may query another device to determine a status update. For example, a user device 150 may query another device (e.g., device 100, database 160, etc.) to determine whether a dispute status has changed since the last dispute status received (e.g., by user device 150). In response, a device receiving the query (e.g., device 100) may transmit a dispute status to a device that transmitted the query (e.g., user device 150). In some embodiments, a querying device may query another device for a dispute status at a predetermined frequency. In addition to or instead of periodic queries, a querying device may query another device for a dispute status in response to an input received at a user interface (e.g., a user input received at input device 164).

At step 514, process 500 may display a dispute status update (e.g., a dispute status update determined at step 512). A displayed dispute status update may be displayed at a user device 150 in response to receiving the dispute status update from a device 100. A device (e.g., user device 150) may display a dispute status update (e.g. "reviewing dispute," "awaiting customer response," "documentation sent," "dispute resolved"). As at step 510, displaying a dispute status update may include a visual indicator showing progress of a dispute may be displayed. In some embodiments, displaying a dispute status update may include displaying user interface elements.

In some embodiments, some user interface elements may only be displayable, displayed, and/or interactable when a particular dispute status update has been determined. For example, a user interface element associated with downloading and/or signing a digital document (e.g., a user interface element displaying an image that allows for a user signature from an input device) may only be displayed when a particular dispute status update is determined, such as "transaction posted" or "dispute reviewed." In some embodiments, a device 100 may transmit information to control the display of a user device 150 (e.g., through an application on the user device 150) in a particular way (e.g., display or not display certain user interface elements and/or enable or not enable certain functionality, such as transmitting dispute request input data). In this manner, displaying certain user interface elements and/or enabling certain functionality (e.g., allowing a user to open an image, sign an image, submit a status inquiry) may be influenced by actions taking place remotely from a device (e.g., user device 150) such as the monitoring and/or detecting of particular extracts by another device (e.g., device 100).

In some embodiments, a user interface element may only be displayable, displayed, and/or interactable after dispute data has indicated a particular dispute status for a predetermined threshold of time. As a non-limiting example, a user interface element for submitting a status inquiry (e.g., prompting a user device to query another device for a dispute status update) may only be interactable after a dispute status of "submitted" has been pending for three days and no dispute status update has been determined. In this manner, strain on networks (e.g., bandwidth) and resources (e.g., processing resources of a device 100) may be conserved by limiting the frequency of queries (e.g., to check for a dispute status update).

FIG. 6-A depicts an exemplary user interface 60-A that may be displayed by a device, consistent with disclosed embodiments. For example, user interface 60-A may be displayed as part of process 300 or process 500. In some embodiments, user interface 60-A may be a dispute request interface. In some embodiments, input received at user interface 60-A may be processed, stored, and/or transmitted, consistent with disclosed embodiments. In some embodiments, user interface 60-A may include at least one tab 600-A (multiple tabs are shown in exemplary user interface 60-A). In some embodiments, a selection of a tab 600-A may cause a different user interface (e.g., user interface 60-J) to be displayed. User interface 60-A may also include an information area 602-A, which may display information related to a pending dispute, incomplete dispute, and/or any other dispute data. In some embodiments, user interface 60-A may also include at least one selector 604-A (multiple selectors shown in exemplary user interface 60-A). In some embodiments, selecting a selector 604-A (e.g., with an input device 164) may initiate or alter a dispute process, consistent with the disclosed embodiments.

FIG. 6-B depicts an exemplary user interface 60-B that may be displayed by a device, consistent with the disclosed embodiments. For example, user interface 60-B may be displayed as part of process 300 or process 500. In some embodiments, user interface 60-B may be a dispute request interface. In some embodiments, input received at user interface 60-B may be processed, stored, and/or transmitted, consistent with disclosed embodiments. In some embodiments, user interface 60-B may include sequence step indicators 600-B, which may be selectable (e.g., with an input device 164). In some embodiments, a sequence step indicator 600-B may only be selectable after information has been input into a user interface associated with a preceding sequence step indicator 600-B. In some embodiments, selecting a sequence step indicator 600-B may cause particular dispute data and/or graphical user interface elements to be displayed. In some embodiments, user interface 60-B may include at least one transaction selector 602-B (multiple shown in exemplary user interface 60-B), which may be displayed in response to a selection of a user interface element (e.g., a selector 604-A, a sequence step indicator 600-B, etc.). In some embodiments, a transaction selector 602-B may include transaction and/or dispute data. In some embodiments, user interface 60-B may include a progression selector 604-B, which may cause the display (e.g., at display 170) of a different user interface (e.g., user interface 60-C) when selected.

FIG. 6-C depicts an exemplary user interface 60-C that may be displayed by a device, consistent with the disclosed embodiments. For example, user interface 60-C may be displayed as part of process 300 or process 500. In some embodiments, user interface 60-C may be a dispute request interface. In some embodiments, input received at user interface 60-C may be processed, stored, and/or transmitted, consistent with disclosed embodiments. In some embodiments, user interface 60-C may include a sequence step indicator 600-C, which may have an altered visual appearance (e.g., displaying a visual pictograph instead of a numeral), which may have occurred in response to input received at another user interface (e.g., user interface 60-B). In some embodiments, user interface 60-C may include a number of selectable dispute reasons, as shown in exemplary FIG. 6-C.

FIG. 6-D depicts an exemplary user interface 60-D that may be displayed by a device, consistent with the disclosed embodiments. For example, user interface 60-D may be displayed as part of process 300 or process 500. In some embodiments, user interface 60-D may be a dispute request interface. In some embodiments, input received at user interface 60-D may be processed, stored, and/or transmitted, consistent with disclosed embodiments. In some embodiments, user interface 60-D may include an amount area 600-D, at which a user may input an amount (e.g., an amount associated with a transaction and/or dispute). In some embodiments, user interface 60-D may include a regression selector 602-D, which may cause the display (e.g., at display 170) of a different user interface (e.g., a user interface associated with a preceding sequence step) when selected. In the exemplary figure, user interface 60-D is also shown with a progression selector.

FIG. 6-E depicts an exemplary user interface 60-E that may be displayed by a device, consistent with the disclosed embodiments. For example, user interface 60-E may be displayed as part of process 300 or process 500. In some embodiments, user interface 60-E may be a dispute request interface. In some embodiments, input received at user interface 60-E may be processed, stored, and/or transmitted, consistent with disclosed embodiments. In some embodiments, user interface 60-E may include an image display area 600-E, which may display a live image or a captured image, either or which may have been received by an input device 164 (e.g., an image capturing component of user device 150, such as a camera). In some embodiments, user interface 60-E may include at least one image function element 602-E (multiple shown), which may cause an input device 164 to capture an image, may cause the deletion (e.g., from memory 154) of image data, and/or may activate or deactivate an image generation function (e.g., flash, exposure time, focus, cropping, and/or any other alteration to visual information detected at an input device 164).

FIG. 6-F depicts an exemplary user interface 60-F that may be displayed by a device, consistent with the disclosed embodiments. For example, user interface 60-F may be displayed as part of process 300 or process 500. In some embodiments, user interface 60-F may be a dispute request interface. In some embodiments, input received at user interface 60-F may be processed, stored, and/or transmitted, consistent with disclosed embodiments. In some embodiments, user interface 60-F may include a purchase description area 600-F, which may accept an input for describing a purchased product or products. For example, a user may input text, an image, a product identifier, and/or any other information identifying a product into purchase description area 600-F.

FIG. 6-G depicts an exemplary user interface 60-G that may be displayed by a device, consistent with the disclosed embodiments. For example, user interface 60-G may be displayed as part of process 300 or process 500. In some embodiments, user interface 60-G may be a dispute request interface. In some embodiments, input received at user interface 60-G may be processed, stored, and/or transmitted, consistent with disclosed embodiments. In some embodiments, user interface 60-G may include an attempt description area 600-G, which may accept an input for describing a dispute resolution attempt. For example, a user may input text, an image, a merchant identifier, a date, a time, and/or any other information related to a dispute resolution attempt.

FIG. 6-H depicts an exemplary user interface 60-H that may be displayed by a device, consistent with the disclosed embodiments. For example, user interface 60-H may be displayed as part of process 300 or process 500. In some embodiments, user interface 60-H may be a dispute request interface. In some embodiments, input received at user interface 60-H may be processed, stored, and/or transmitted, consistent with disclosed embodiments. In some embodiments, user interface 60-H may include a dispute submission element 600-H. In some embodiments, selection of dispute submission element 600-H may transmit information (e.g., dispute data) to a device (e.g., device 100), consistent with the disclosed embodiments.

FIG. 6-I depicts an exemplary user interface 60-I that may be displayed by a device, consistent with the disclosed embodiments. For example, user interface 60-I may be displayed as part of process 300 or process 500. In some embodiments, user interface 60-I may be a dispute request interface. In some embodiments, input received at user interface 60-I may be processed, stored, and/or transmitted, consistent with disclosed embodiments. In some embodiments, user interface 60-I may include information associated with documents, images, signatures, and/or any data associated with a dispute. For example, user interface 60-I may include an upload selector 600-I, which may, upon selection, cause the display (e.g., in a separate window or the same window as user interface 60-I) of a data element (e.g., an image) that a user has uploaded, which may be linked to a particular dispute. In some embodiments, user interface 60-I may include an upload descriptor 602-I which may display information associated with an uploaded data element (e.g., a document), such as an upload type (e.g., document, image, signature), a date (e.g., a date when uploaded, a date when reviewed by another entity, etc.), and/or a verification status. In some embodiments, user interface 60-I may include a deletion selector 604-I, which may delete data associated with a dispute (e.g., data input using a user interface, such as an image, document, transaction data, etc.).

FIGS. 6-A through 6-I show exemplary user interfaces, elements of which (e.g., input areas, information areas, selectors, indicators, descriptors) may be re-arranged, removed, combined, added, and/or changed into any combination or sub-combination to implement any technique disclosed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A method for managing transaction disputes, comprising:
   accessing a transaction pattern model associated with a user account;
   detecting deviation of a transaction from the transaction pattern model;
   transmitting, via a network interface and based on the detected deviation, transaction data to a user device, the transaction data including deviation data, wherein the deviation data indicates a potentially erroneous transaction;
   receiving input data entered at the user device in response to the transmitted transaction data, wherein the input data includes a transaction status indicator that indicates that a user identifies the transaction as erroneous;
   translating the received input data to a first application programming interface (API) format;
   determining a dispute status based on the transaction data, the deviation data, the transaction status indicator, and the input data; and
   on a condition that the dispute status indicates that a transaction is disputed, generating dispute data based on the input data, the transaction status indicator, and the transaction data.

2. The method of claim 1, wherein the dispute status includes a likelihood of an accuracy of the transaction status indicator.

3. The method of claim 2, wherein the likelihood is based on at least one of: the transaction data, account data relating to the user, the input data, or the deviation data.

4. The method of claim 1, further comprising:
   storing the dispute data;
   monitoring data extracts for a data profile based on the dispute data, the data extracts associated with the user account;
   detecting, based on the monitoring, one of the data extracts indicating a posted state of a transaction associated with the dispute data; and
   updating the dispute data based on the one of the data extracts indicating the posted state.

5. The method of claim 4, wherein:
   storing the dispute data comprises storing the dispute data in a first database; and
   the method further comprises storing the updated dispute data in a second database.

6. The method of claim 4, wherein:
   the monitoring of the data extracts occurs during a first time period;
   the method further comprises monitoring data extracts during a second time period; and
   the deviation is detected based on the monitoring during the second time period.

7. The method of claim 1, further comprising:
   generating the transaction pattern model based on unique transaction data of the user account.

8. The method of claim 7, wherein:
   the user account is a first user account; and
   generating the transaction pattern model is further based on transaction data of a second user account.

9. The method of claim 7, further comprising:
   updating the transaction pattern model based on the received input.

10. The method of claim 1, wherein the transmitted transaction data comprises data from two similar transactions of the user account that are determined to be similar based on both transactions having at least one of: a same transaction date, a same merchant, a same transaction payment method, or a same transaction amount.

11. The method of claim 1, wherein the transmitted transaction data comprises data from two similar transactions of the user account that are determined to be similar based on both transactions having at least one of: a transaction date within a threshold number of days of each other, merchants operating in the same industry, merchant names having a threshold number of characters or words in common, or a transaction amount within a threshold amount of each other.

12. The method of claim 1, further comprising:
   formatting the transaction data for display at a user interface of the user device, wherein the input is received at the user interface and comprises at least one of: a dispute reason, a correct transaction amount, an image of a receipt, or an item identifier.

13. A system for managing transaction disputes, the system comprising:
   a network interface;
   at least one processor; and
   a non-transitory computer-readable medium containing a set of instructions that, when executed by the at least one processor, cause the at least one processor to perform operations comprising:
      accessing a transaction pattern model associated with a user account;
      detecting deviation of a transaction from the transaction pattern model;
      transmitting, via the network interface and based on the detected deviation, transaction data to a user device, the transaction data including deviation data, wherein the deviation data indicates a potentially erroneous transaction;
      receiving input data entered at the user device in response to the transmitted transaction data, wherein the input data includes a transaction status indicator that indicates that a user identifies the transaction as erroneous;
      translating the received input data to a first application programming interface (API) format;
      determining a dispute status based on the transaction data, the deviation data, the transaction status indicator, and the input data; and
      on a condition that the dispute status indicates that a transaction is disputed, generating dispute data based on the input data, the transaction status indicator, and the transaction data.

14. The system of claim 13, the operations further comprising:
   storing the dispute data;
   monitoring data extracts for a data profile based on the dispute data, the data extracts associated with the user account;
   detecting, based on the monitoring, one of the data extracts indicating a posted state of a transaction associated with the dispute data; and updating the dispute data based on the one of the data extracts indicating the posted state.

15. The system of claim 14, wherein:
storing the dispute data comprises storing the dispute data in a first database; and
the operations further comprise storing the updated dispute data in a second database.

16. The system of claim 14, wherein:
the monitoring of the data extracts occurs during a first time period;
the method further comprises monitoring data extracts during a second time period; and
the deviation is detected based on the monitoring during the second time period.

17. The system of claim 13, the operations further comprising:
generating the transaction pattern model based on unique transaction data of the user account.

18. The system of claim 17, wherein:
the user account is a first user account; and
generating the transaction pattern model is further based on transaction data of a second user account.

19. The system of claim 17, the operations further comprising:
updating the transaction pattern model based on the received input.

20. The system of claim 13, wherein the transmitted transaction data comprises data from two similar transactions of the user account that are determined to be similar based on both transactions having at least one of: a same transaction date, a same merchant, a same transaction payment method, or a same transaction amount.

* * * * *